DEFLECTING SYSTEM

Filed May 16, 1955

INVENTOR
R. C. NEWHOUSE
BY
[signature]
ATTORNEY

United States Patent Office 2,821,657

Patented Jan. 28, 1958

2,821,657

DEFLECTING SYSTEM

Russell C. Newhouse, Short Hills, N. J., assignor to Bell Telephone Laboratories, Incorporated, New York, N. Y., a corporation of New York Application May 16, 1955, Serial No. 508,609

10 Claims. (Cl. 315—27)

This invention relates to cathode ray tube deflecting systems, and particularly to an improved circuit for producing an electromagnetic deflecting field for a cathode ray tube.

In many cathode ray tube display systems the electron beam is cyclically deflected, or swept, across the screen of the tube at a uniform rate. The direction of the sweep may be always in a given direction, as horizontal or vertical, or may be radially from the center of the screen. In some such arrangements, the beam is also swept in an opposed direction across the screen at a different uniform rate. In television receivers, for example, the beam is swept horizontally across the screen 525 times for every 2 vertical sweeps, there being 15,750 horizontal sweeps and 60 vertical sweeps each second. In other arrangements the sweep in the opposing direction is variable in response to a non-linear variable quantity.

A widely utilized method of producing such beam deflections is to establish an electromagnetic field perpendicular to both the direction of the beam and the direction in which it is desired to deflect it. If the field strength is increased at a uniform rate, the beam will likewise be deflected at a uniform rate. The maximum magnitude of the field determines the maximum deflection of the beam. Such a field is conveniently produced by a deflection coil supplied with a cyclic current having a sawtooth waveshape, the current in each cycle increasing at a uniform rate and then suddenly being reduced to a small or zero value. In arrangements where the beam is to be deflected in one direction in accordance with a non-linear variable quantity, the deflection coil may be supplied with a current which varies with time in the same manner as the variable quantity does relative to a chosen independent parameter.

In any such deflecting system the production of a perfectly focussed and undistorted image on the cathode ray tube screen would require that the electromagnetic field established by the coil be uniform in direction and strength over the entire cross-section of the electron beam and over the complete deflection angle. Also, the screen would need to be formed as a spherical surface concentric with the center of the deflecting field. Both these requirements are impracticable of full realization, the latter because of the necessity that the screen be as nearly flat as possible for ease of viewing and to facilitate making measurements directly on it. The obstacles to attainment of a truly uniform deflecting field are many. One is that due to the curvature of the flux lines produced by a symmetrically wound deflecting coil the lines intersect the axis of the coil at right angles while at points above and below the axis they are slanted relative to the axial direction. Since the electron beam is centered on the coil axis and has a definite cross section, electrons on the axis are deflected more than those above and below. A beam cross-section originally round is thereby flattened into an oval. Other causes of field distortion include oscillations produced by the distributed capacitance of the deflecting coil, interaction between the focussing and deflecting fields, asymmetry of magnetic material in the deflecting field, hysteresis and eddy current effects in such magnetic material, and field fringing beyond the confines of the coil.

In order to attain a higher degree of uniformity of deflecting fields resort has been made to deflecting coils having tapered windings, the turns of the winding being non-uniformly spaced. With the proper tapering it is possible to compensate to a considerable extent for the various factors tending to produce field distortion. However, since so many factors influence the configuration of the resultant field, the tapering must be experimentally determined for each individual cathode ray tube. Preassembled coils having a particular taper will not generally prove satisfactory for different types of cathode ray tubes, or even for different tubes of the same type.

In addition to the field distortion problem, the design of electromagnetic deflecting systems is complicated by the maximum voltage and current handling ability of the amplifier which energizes the deflecting coil. These factors are most apparent in uniform rate deflection circuits, wherein a generator of a sweep voltage having a sawtooth waveshape feeds an amplifier which supplies current to the deflecting coil. If the cathode ray beam is to move uniformly across the screen the current must have a true sawtooth waveshape. This is often achieved by using an amplifier having a large output resistive impedance in comparison to the inductive impedance of the deflection coil. Also, in order to prevent oscillation at the sweep repetition frequency it is necessary to keep the distributed capacitance of the coil to a minimum. This means that the number of coil turns must be kept as low as possible consistent with attainment of the required number of ampere-turns for the desired deflection sensitivity. The consequence is a need for large coil currents, and so a large output current from the amplifier. The realization of both large output current and large output resistance is restricted by the maximum operating voltage of the amplifier output tube. Hence it is not uncommon for coil driving amplifiers to have several tubes connected in parallel to deliver the requisite coil current. Such an arrangement is expensive, inefficient in power consumption, takes up much space, and generates an undesirable amount of heat.

In order to permit use of a single tube driving amplifier while still providing a desired deflection sensitivity, a compromise of the foregoing requirements can be made by increasing the number of coil turns. The consequent increase in coil inductance is undesirable because of the deflection linearity considerations described above. However, even if a degree of non-linearity is tolerable, the increased inductance will result in a large inductive transient voltage across the coil at the end of each cycle of the sawtooth current through it. Since this voltage is applied to the driving amplifier, the maximum voltage that the tube can stand without damage sets a limit on the tolerable inductance of the deflecting coil. In addition, the larger the coil inductance the larger will be the reverse transient voltage across the usual diode leak circuit connected across the coil to increase the speed of coil current decrement after each sweep cycle. The maximum reverse voltage that the diode circuit can stand without damage is therefore another factor contributing to limit the tolerable inductance of the deflecting coil.

These considerations make it evident that the design of deflecting systems is presently a matter of considerable difficulty. Either too few or too many coil turns will result in failure of the deflection circuit to operate properly.

An object of the invention is to provide an improved electromagnetic deflection system for cathode ray tubes.

A further object is to provide a cathode ray tube deflection system which can be readily adjusted to provide any desired deflecting field configuration without altering the deflecting coil and wherein the coil may be uniformly wound.

A further object is to provide a cathode ray tube deflection circuit which places very low maximum voltage and current requirements on deflecting signal amplifiers for driving the deflection coil, and wherein such amplifiers require little power for their operation.

A further object is to provide a cathode ray tube deflection circuit which does not produce large inductive transient voltages in the deflecting coil.

According to the invention the deflecting coil of a cathode ray tube is arranged as several electrically separate coil sections, each driven by its own amplifier. All the amplifiers are fed from a common source of a sawtooth deflecting signal voltage or current through individual signal dividing means which permit variation of the relative magnitudes of the voltages or currents applied to the amplifiers. The coil deflection sensitivity depends on the total ampere-turns, so for a given sensitivity the only requirement is that the total ampere-turns of all coil sections remain constant. The current supplied to each section, or the number of turns of each section, or both can therefore be much less than the current and turns requirements of a single composite deflecting coil. Since the inductance of a coil is proportional to the square of the number of its turns, the reduced number of turns of each coil section means that the inductive transient voltage produced by each section after each cycle of the sawtooth current will be lower than would be produced by a composite deflecting coil. The reduced turns per section additionally results in a much lower stray capacitance per section, thereby avoiding oscillation at even very high sweep repetition rates. By adjusting either the relative proportions of the deflecting signal applied to the amplifiers or the relative gains of the amplifiers the relative currents in the coil sections can be set as desired. Hence the ampere-turns of the sections can be adjusted to produce a field distribution which results in a constant electron beam cross-section and focus as the beam is deflected across the entire face of the tube screen. Alternatively, each coil section may have different numbers of turns, all being driven by the same or different currents. Since each section can be linearly wound, such an arrangement will provide a tapered field with standard coils.

A particular feature of the invention resides in the use of transistor rather than vacuum tube amplifiers for driving the coils. The practicability of transistors as driving amplifiers is a result of the fact that each coil section only requires a small fraction of the current which a composite deflecting coil would necessitate. The low power requirements of transistors complements the low current requirements of the coil sections, since the use of a vacuum tube amplifier to drive each coil section would require an inordinate amount of power and space and would produce excessive heat. The small size and low heat production of the transistor circuit permits encasing it in a small integral package.

Other objects and features of the invention will be apparent from the following specification and accompanying drawings, in which.

Figure 1:
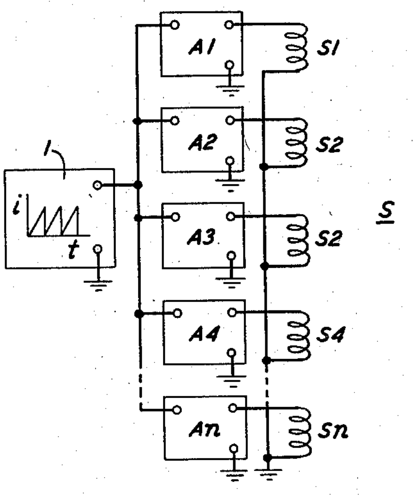
Fig. 1 is a block diagram of a deflecting circuit incorporating the basic features of the invention.

Referring to Fig. 1, a sweep signal source 1 provides a current or voltage for deflecting the beam of a cathode ray tube across the tube screen. Since a linear deflection system will serve to illustrate the operation of the invention, the signal is assumed to have the linear sawtooth waveshape indicated in block 1 as a plot of current $(i)$ against time $(t)$. The deflecting signal is applied to a deflecting coil made up of parallel connected coil sections S1, S2, S3, . . . S*n* by way of individual amplifiers A1, A2, A3, . . . A*n*, respectively. Although these coil sections are separately driven they may be, and conveniently are, assembled on the yoke of a cathode ray tube in the same manner as a single coil. Any conventional type of coil assembly may be used, a variety being described in the text "Cathode Ray Tube Displays," M. I. T. Radiation Laboratory Series, 1st Edition, 1948, McGraw-Hill Co., Inc., on pages 316–337. Amplifiers A1, A2, . . . A*n* are of any type which will produce an output current having the same waveshape as the signal applied to their input terminals, so that at the output of each is produced a current having a linear sawtooth waveshape. The amplifiers are adjusted so that the relative magnitudes of their respective output currents produce desired relative numbers of ampere-turns of the various coil sections. This adjustment may be made by altering the relative gains of the amplifiers by conventional means. Since all amplifiers are fed from a single source, the output currents are of the same frequency and of fixed relative phases. With the proper relative numbers of ampere-turns the coil sections will collectively produce a resultant deflecting field which causes the spot on the screen on the cathode ray tube to move with constant focus and cross-section across the width of the screen, resulting in a deflection line of constant focus and width.

Figure 2:
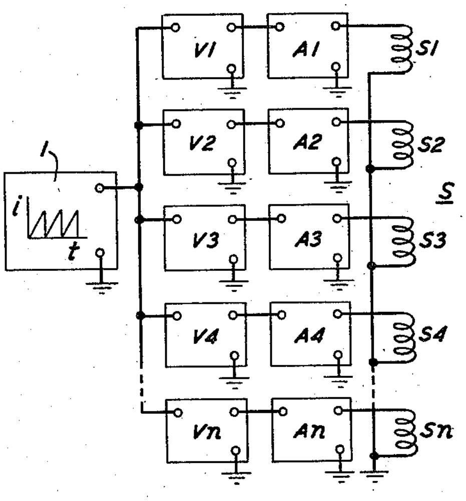
Fig. 2 is a block diagram of a modification of the deflecting circuit of Fig. 1 to include means for adjusting the deflecting field configuration as desired.

Fig. 2 shows a modification of the arrangement in Fig. 1, wherein amplifiers A1, A2, . . . A*n* are connected to source 1 through individual signal dividing means V1, V2, . . . V*n*, respectively. These may be transformers, potentiometers, attenuators, or any other device capable of producing at its output terminals a current or voltage which is a desired fraction of the current or voltage applied to its input terminals. Here again, the output currents of the dividing means are of the same frequency and of fixed relative phases since they are all derived from a common source. With this arrangement all the amplifiers may have the same gain and may, conveniently, be identical. Hence, the entire circuit is comprised of simple and identical units interconnected as shown. An evident modification of this arrangement is the substitution of a single signal dividing means, such as a tapped transformer or potentiometer, for the plural means shown connected between source 1 and the several amplifiers.

Figure 3:
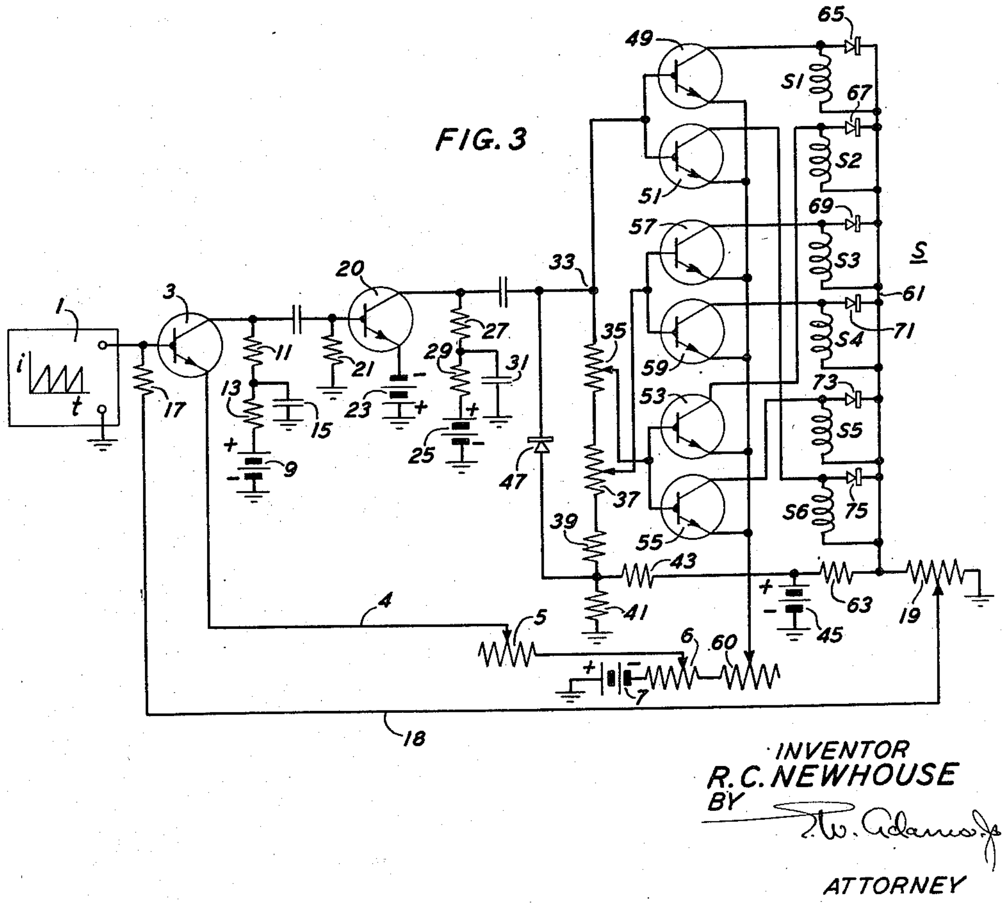
Fig. 3 is a schematic diagram of a circuit arrangement of the embodiment of the invention as shown in Fig. 2.

Fig. 3 is a detailed circuit embodying the arrangement of Fig. 2. Here, all amplification is obtained by the use of transistor circuits to obtain the particular advantages of transistors referred to above. It will be understood, however, that if desired one or more of the transistor stages may be replaced by equivalent vacuum tube amplifiers. In the drawing all polarities are indicated on the basis that all transistors are either n-p-n junction type or p-type point contact transistors. It will be obvious to those skilled in the art that with minor modifications, including reversal of battery polarities, the described circuit would be equally effective if p-n-p junction type or n-type point contact transistors were substituted for any or all of the n-p-n transistors. The emitter lead of each transistor is designated with an arrow pointing in the direction of current flow.

Current supplied by source 1 is applied to the base of a transistor 3 connected as a grounded emitter amplifier. Emitter current bias is provided by connecting the emitter via lead 4, rheostat 5, and the brush of potentiometer 6 to a source 7 of negative potential with respect to ground. Potentiometer 6 is part of a feedback arrangement to be described hereinafter. The collector of transistor 3 is biased by connection to source 9 of positive potential relative to ground through series connected resistors 11 and 13. Resistors 11 and 13 serve as the output load for transistor 3. Resistor 13 is bypassed to ground by a capacitor 15, so that at high frequencies it is virtually short-circuited. At low frequencies however, where the amplifier response otherwise tends to drop, the increased impedance of capacitor 15 results in an increase of the effective load of transistor 3. The low frequency response is thereby materially improved. A further advantage of the combination of resistor 13 and condenser 5 is that they serve as a well-known temperature stabilizing circuit which reduces variation of the collector operating characteristics with temperature. The base of transistor 3 is connected to ground by way of resistor 17, lead 18 and grounded potentiometer 19. Potentiometer 19 is part of a second feedback arrangement described hereinafter.

The collector of transistor 3 is connected through a coupling capacitor to the base of a transistor 20 which is also connected as a grounded emitter amplifier. The base of transistor 20 is returned to ground by a resistor 21. The emitter is biased negatively with respect to ground by connection to D.-C. source 23. The collector is biased positively with respect to ground by connection to source 25 through series connected load resistors 27 and 29. The latter resistor in conjunction with its grounded bypass condenser 31 serves to improve the low frequency response and temperature stabilization of transistor 20, as described above with reference to transistor 3. The collector is also connected through a blocking condenser to output terminal 33.

In this circuit configuration transistors 3 and 20 constitute a two stage cascade amplifier, supplying to terminal 33 a current which is an amplified replica of the output current of source 1. Connected between terminal 33 and ground is a current dividing means comprising, in series, potentiometer 35, potentiometer 37, resistor 39 and resistor 41. The junction of resistors 39 and 41 is connected through a resistor 43 to a source 45 of positive potential with respect to ground. This junction point is also connected to terminal 33 by a diode 47 poled to permit conduction toward terminal 33. Diode 47 serves to clamp the level of direct current at terminal 33 to a minimum positive value set by source 45 and resistors 41 and 43. This stabilizes the direct current entering terminal 33 during the intervals between successive cycles of the sawtooth current produced by source 1, in order to maintain the correct current bias conditions for succeeding transistor amplifier stages connected to that terminal as now to be described.

Connected in parallel to terminal 33 are the bases of a pair of transistors 49 and 51. Connected in parallel to the brush of potentiometer 35 are the bases of two transistors 53 and 55; and connected in parallel to the brush of potentiometer 37 are the bases of two more transistors 57 and 59. These transistors are preferably identical, and are connected as grounded emitter amplifiers. They serve as individual driving amplifiers for the sections S1, S6, S2, S5, S3 and S4 respectively, of deflecting coil S. The emitters of these transistors are connected together and through a rheostat 60 to the terminal of potentiometer 6, being biased by source 7 in the same manner as transistor 3 described above. It is therefore evident that most of the current at terminal 33 is applied to transistors 49 and 51, a definite proportion of that current is applied to transistors 53 and 55, and a smaller proportion of it is applied to transistors 57 and 59. By adjusting the brush settings of potentiometers 35 and 37 the relative proportions of these currents can be set as desired. If it should be desired to apply equal currents to all of these transistors, the bases of all may be connected directly to terminal 33. Resistor 39 serves to prevent by-passing transistors 57 and 59 completely when the brush of potentiometer 37 is moved to its lowest position. The collectors of the several transistors are connected through their associated deflection coil sections, respectively, to a lead 61 which is connected through a resistor 63 to the terminal of positive D.-C. source 45. Shunting each of coil sections S1, S2, S3, S4, S5, and S6, respectively, are diodes 65, 67, 69, 71, 73, and 75. Each diode is poled so as to prevent flow through it of collector current in the normal direction, which for an n-p-n junction transistor is from source 45 toward the collector.

The signal applied to the bases of transistors 49, 51, 53, 55, 57, and 59 will be a linear sawtooth current of the same waveshape as the current supplied by source 1. As indicated above, for linear deflection of an electron beam it is necessary that the currents supplied to the various coil sections have a linear sawtooth waveshape. Hence the collector currents must have such a waveshape. For the purpose of utilizing the sawtooth base currents to produce currents of accurately linear sawtooth waveshape at the collectors there is degeneratively fed back to the base of each of these transistors a current having the same waveshape as the collector current. Any difference between the input current applied to the base and the feedback current applied to the base will result in a net correcting current to which the transistor will respond to reduce it to zero. The collector current will therefore be forced to have a waveshape identical with that of the sawtooth input current.

In Fig. 3, resistor 63 serves as the collector current feedback resistor for all of the transistor driving amplifiers. The current flowing in resistor 63 is the total of the collector currents. Since all the transistors are the same, and are connected similarly, their collector currents will have the same waveshape even though the relative amplitudes may differ. Consequently, the total current in resistor 63, and therefore the voltage across it, will have the same waveshape as the collector current of any of these transistors. This voltage appears across potentiometer 19, and a portion of it determined by the setting of the brush of potentiometer 19 provides feedback current to the base of transistor 3 in a path through lead 18 and resistor 17. The feedback is degenerative because an increase in the current flowing into the base of any of the transistors produces a decrease in the current flowing into the base of the succeeding cascaded transistor. While this is not necessarily true for point contact transistors, it can be made the case by using sufficiently large load resistors. Accordingly, an increase in the collector currents of the driving transistors tends to reduce the base current of transistor 3. This tends to increase the base current of transistor 20, and in turn to decrease the base currents of the driving transistors. This result tends to prevent the initial increase of the collector currents of the driving transistors, thereby achieving the desired correcting effect.

Since the collector current of a transistor constitutes the major portion of the emitter current, the emitter currents of coil driving transistors 49, 51, 53, 55, 57, and 59 have a waveshape approximating the waveshape of the collector currents. These emitter currents produce a voltage drop across potentiometer 6, thereby changing the voltage at the brush. Since the brush voltage constitutes the effective bias voltage for transistor 3, this circuit constitutes another feedback loop between the driving transistors and transistor 3. Rheostat 5 inserts sufficient resistance in series with the voltage at the brush of potentiometer 6 so the current applied to the emitter of transistor 3 will be independent of changes in the emitter impedance. Rheosat 60 serves the same function for the coil driving transistors. There are two phase reversals between the collector of transistor 3 and the collectors of the coil driving transistors. Consequently the collector currents, and therefore the emitter currents, of transistor 3 and the driving transistors are in phase. An increase in the emitter current of transistor 3 is accompanied by an increase in the emitter currents of all the driving transistors, and so by a great increase of the current in potentiometer 6. This tends to reduce the effective bias voltage applied to the emitter of transistor 3, and therefore the bias current. Hence this feedback loop is degenerative. By varying the settings of rheostat 5 and potentiometer 19, the two feedback loops can be adjusted over wide limits to achieve the best possible overall linearity of the sawtooth current in the deflection coil sections.

Coil sections S1 and S6 will carry most of the current supplied to terminal 33, coil sections S2 and S5 will carry somewhat less current, and coil sections S3 and S4 will carry the least current. This results in a tapered deflecting coil which produces a resultant deflecting field of minimum divergence from the coil axis and therefore of substantially uniform strength and direction. As described above, the degree of tapering can readily be adjusted as desired by manipulation of potentiometers 35 and 37.

An evident modification of Fig. 3 would be to connect the bases of the 6 output transistors in multiple to terminal 33, resulting in equal collector currents, and to use fewer coil turns for coil sections S2 and S5 than for sections S1 and S6, and fewer turns for sections S3 and S4 than for S2 and S5. Each coil section can, of course, be linearly wound. This modification will result in a tapered field with uniformly wound coils. It is also evident that if deflection field tapering is not desired, equal numbers of coil section turns may be used.

The factors determining the number of deflection coil sections to be used are the field tapering desired and the peak permissible collector voltage and current ratings of the transistors connected to the coil sections. Increasing the number of sections will reduce the requisite current per section, enabling use of transistors having relatively low maximum ratings.

The embodiment of the invention disclosed in Fig. 3 provides a uniform deflection of the electron beam in a constant direction. The direction will be dependent on the orientation of coil S relative to the electron beam when mounted on a cathode ray tube, according to principles of beam deflection well known in the art. It is evident that if it should be desired to have a non-uniform beam deflection it would only be necessary to replace signal source 1 by a source producing a current having a waveform corresponding to the desired type of deflection. For example, a step waveform current would result in a succession of rapid deflections of the electron beam over short distances in the same direction, interspersed with intervals during which the beam remains in the same position relative to that direction. It is further evident that although the invention has been described with reference to deflection of an electron beam along only one rectilinear coordinate axis, more than one of the described embodiments may be used simultaneously to produce deflection of the electron beam of a cathode ray tube simultaneously along more than one rectilinear axis of the tube.

What is claimed is:

1. In a system for deflecting the electron beam of a cathode ray tube along each of a plurality of rectilinear coordinate axes in response to a particular deflecting signal for each of said axes, the combination of a plurality of amplifiers for each of said axes, a plurality of deflection coils respectively connected to said amplifiers, the coils connected to the amplifiers for any one of said axes being adapted to collectively establish an electromagnetic field for deflecting said electron beam along that one axis, and means for respectively applying each one of said deflecting signals to all of the amplifiers for the corresponding one of said axes.

2. In a system for deflecting the electron beam of a cathode ray tube along one rectilinear coordinate axis in response to a deflecting signal, the combination of a plurality of deflection coils adapted to collectively establish an electromagnetic field for deflecting said electron beam along said one coordinate axis, a plurality of deflecting signal amplifiers respectively connected to said coils, and means for applying said deflecting signal to all of said amplifiers.

3. In a system for deflecting the electron beam of a cathode ray tube along one rectilinear coordinate axis in response to a deflecting signal, the combination of a plurality of deflection coils adapted to collectively establish an electromagnetic field for deflecting said electron beam along said one coordinate axis, a plurality of deflecting signal amplifiers respectively connected to said coils, signal dividing means having a plurality of output terminals respectively connected to said amplifiers, and means for applying said deflecting signal to said signal dividing means, said signal dividing means being adapted to produce preselected proportions of said deflecting signal at each of its output terminals.

4. In a system for deflecting the electron beam of a cathode ray tube in response to a deflecting signal, the combination of a plurality of deflecting signal amplifiers, a plurality of deflection coils respectively connected to said amplifiers and adapted to collectively establish an electromagnetic field for deflecting said electron beam, said coils having different relative numbers of turns, and means for applying said deflecting signal to all of said amplifiers in parallel.

5. In a system for deflecting the electron beam of a cathode ray tube in response to a deflecting signal, the combination of a plurality of deflection coils adapted to collectively establish an electromagnetic field for deflecting said electron beam, said coils having differing relative numbers of turns, a plurality of deflecting signal amplifiers respectively connected to said coils, signal dividing means, and means for applying said deflecting signal to said signal dividing means, said signal dividing means having a plurality of output terminals respectively connected to said amplifiers at which it is adapted to produce preselected proportions of said deflecting signal.

6. In a system for deflecting the electron beam of a cathode ray tube in response to a deflecting signal, the combination of a plurality of deflection coils adapted to collectively establish an electromagnetic field for deflecting said electron beam, signal dividing means, means for applying said deflecting signal to said signal dividing means, said signal dividing means having a plurality of output terminals at which it is adapted to produce preselected proportions of said deflecting signal, and means respectively connecting said coils with said output terminals.

7. In a system for deflecting the electron beam of a cathode ray tube in response to a deflecting current, a plurality of coils constructed and arranged to collectively produce an electromagnetic field which interacts with said electron beam to deflect it, a plurality of transistor amplifiers respectively connected to said coils, and means for applying said deflecting current to each of said amplifiers, said amplifiers being adapted to supply said coils with currents of preselected relative magnitudes, the relative number of turns of said coils and the relative magnitudes of the coil currents being proportioned so as to provide a predetermined distribution of coil ampere-turns for establishing said electromagnetic field.

8. In a system for deflecting the electron beam of a cathode ray tube in response to a deflecting current, a plurality of coils constructed and arranged to collectively produce an electromagnetic field which interacts with said electron beam to deflect it, a plurality of transistor amplifiers respectively connected to said coils, current dividing means, means for applying said deflecting current to said current dividing means, said current dividing means having a plurality of output terminals respectively connected to said transistor amplifiers at which it is adapted to produce preselected proportions of said deflecting current for actuating said amplifiers, said amplifiers being adapted to supply said coils with currents of relative magnitudes dependent on the relative proportions of said deflecting current at each of said output terminals.

9. An electromagnetic deflecting system for a cathode ray tube, comprising a deflecting coil divided into a plurality of electrically separate sections, a plurality of transistor amplifiers having input and output terminals, said amplifiers being respectively connected at their output terminals to said coil sections to supply them with deflecting current, current dividing means having input terminals and a plurality of output terminals, said amplifiers being further respectively connected at their input terminals to the output terminals of said current dividing means, an additional transistor amplifier, said current dividing means being connected at its input terminals to said additional amplifier, and means connected to said coil sections for degeneratively feeding back to said additional amplifier a current having substantially the same waveshape as the total deflecting current of all said coil sections.

10. An electromagnetic deflecting system for a cathode ray tube, comprising a deflecting coil divided into a plurality of electrically separate sections, a plurality of transistor amplifiers having input and output terminals, said amplifiers being respectively connected at their output terminals to said coil sections to supply them with deflecting current, current dividing means having input terminals and a plurality of output terminals, said amplifiers being further respectively connected at their input terminals to the output terminals of said current dividing means, an additional transistor amplifier, said current dividing means being connected at its input terminals to said additional amplifier, means connected to said coil sections for degeneratively feeding back to said additional amplifier a current having substantially the same waveshape as the total deflecting current in all of said coil sections, and further means connected to said amplifiers for degeneratively feeding back to said additional amplifier a further current having substantially the same waveshape as the total deflecting current in all of said coil sections.

References Cited in the file of this patent

UNITED STATES PATENTS

| | | |
|---|---|---|
| 2,093,157 | Nakashima et al. | Sept. 14, 1937 |
| 2,305,930 | Martinelli | Dec. 22, 1942 |
| 2,314,409 | Knoop | Mar. 23, 1943 |
| 2,606,304 | Moore | Aug. 5, 1952 |
| 2,660,691 | Bertram | Nov. 24, 1953 |
| 2,731,567 | Sziklai et al. | Jan. 17, 1956 |